United States Patent Office 3,287,306
Patented Nov. 22, 1966

3,287,306
PREPARATION OF WATER-SOLUBLE ARYLMETHYLENE SULFONIUM POLYMERS
Melvin J. Hatch and Gerald R. Geyer, Midland, Mich., assignors to The Dow Chemical Company, Midland, Mich., a corporation of Delaware
No Drawing. Filed Mar. 1, 1963, Ser. No. 262,184
5 Claims. (Cl. 260—29.6)

This invention concerns a process for preparing arylmethylene sulfonium polymers which are water-soluble or uniformly water-dispersible. More specifically, the present invention concerns a method which utilizes a multi-solvent transfer system to prepare water-soluble or uniformly water-dispersible sulfonium polymers by the reaction of an essentially water-insoluble chloromethylated vinylaromatic resinous polymer with an organic sulfide.

It is an object of the present invention to provide a method for preparing water-soluble or uniformly water-dispersible arylmethylene sulfonium polymers by the reaction of an organic sulfide with an essentially water-insoluble chloromethylated arylvinyl polymer. It is another object of the invention to provide a method which facilitates removal of undersirable impurities present after chloromethylation of a vinyl aromatic polymer and which maintains organic sulfide and essentially water-insoluble chloromethylated polymer reactants and sulfonium polymer product in a single phase by means of a multi-solvent transfer system. Further objects and advantages of the present invention will become perspicuous after a perusal of the following paragraphs.

The term "organic transfer-solvent" will be used herein to define an organic solvent for the chloromethylated intermediate polymers, the sulfide reactants and the sulfonium product polymers, which is also characterized by (1) a solubility in water sufficient to form an aqueous solution containing at least 15 weight percent of the organic solvent and (2) an ability to dissolve sufficient water to form an organic solvent solution containing at least 5 weight percent water. A simple test suffices to evaluate the operability of an organic compound as an organic transfer-solvent.

In the general method of the present invention a chloromethylated vinylaromatic resinous polymer is dissolved in an organic transfer-solvent to furnish a solution containing from about 5 to 60 weight percent polymer. An organic sulfide is added, with stirring, to the dissolved polymer at a rate sufficiently slow to maintain a visually clear solution as chloromethyl groups react with the organic sulfide to form sulfonium groups. The essentially water-insoluble chloromethylated vinylaromatic polymer gradually acquires an increasing degree of water-solubility as the hydrophobic chloromethyl groups are replaced by hydrophilic sulfonium groups. Upon completion of the sulfide addition, the reaction mixture is allowed to stand for a period of from 0 to about 300 minutes and then water is added, with stirring, at a rate sufficiently slow to maintain an essentially one phase system. During the water addition the reaction proceeds until a major proportion of the chloromethyl groups have reacted with the sulfide to produce the water-soluble or uniformly water-dispersible arylmethylene sulfonium polymer desired. The temperature is maintained at about 30° to 70° C. during the course of the reaction.

The chloromethylated vinyl aromatic polymers, which are suitable for use in the method of the present invention, have a molecular weight of from about 5,000 to 200,000, contain an average of from about 0.4 to 1 chloromethyl group per aromatic nucleus, and are substantially linear polymers which are soluble in the organic transfer-solvents described below. Examples of these are polymers of styrene, vinyltoluene, vinylnaphthalene, and, in general, copolymers consisting of a major proportion of a monovinyl aromatic compound and a minor proportion of a monovinyl compound containing no aromatic nuclei which is copolymerizable with styrene, provided said copolymers can be chloromethylated to form products soluble in the organic transfer-solvent as described above. Such polymers and a method for their preparation are described by G. D. Jones in U.S. Patent 2,694,702, and by H. Seifert in U.S. Patent 3,008,927. It is important to remove impurities from the chloromethylated vinyl aromatic polymer employed as a starting material in the method of the present invention. These impurities, which might otherwise react with the organic sulfide or remain as undesirable impurities in the final product, may be removed either by precipitation and drying of the polymer as described by Jones in U.S. Patent 2,694,702 or may be removed by repeated aqueous and acid-aqueous extraction of a solution of the polymer in an essentially water-insoluble organic solvent such as methylene chloride, ethylidene dichloride or ethylene dichloride. Following this removal of impurities, a major proportion of the essentially water-insoluble organic solvent is removed prior to addition of the organic transfer-solvent. If the dried polymer is employed as a starting material, it is directly dissolved in the organic transfer-solvent.

The organic transfer-solvent employed is of critical importance in the method of this invention. This transfer-solvent, previously characterized, dissolves the chloromethylated polymer and sulfide reactants and maintains these reactants and the gradually formed sulfonium-substituted polymer in solution. Upon subsequent addition of water the organic transfer-solvent enables the maintenance of an essentially one-phase system necessary to completion of the reaction. Examples of suitable organic transfer-solvents include 2-(2-ethoxyethoxy)-ethanol, 2-(2-methoxyethoxy)ethanol, dioxane, acetone, isopropyl alcohol and the like. It should be noted that it is not essential that the chloromethylated poly(arylvinyl) resin be completely soluble in the organic transfer-solvent. Thus, chloromethylated polystyrene is not very soluble in isopropyl alcohol but is soluble in a combination of isopropyl alcohol and ethylene dichloride.

The organic sulfide which is employed in the method of the present invention is represented by the formula $$R^1—S—R^2$$

wherein $R^1$ represents an alkyl radical containing from 1 to 3 carbon atoms, inclusive, or a hydroxyalkyl radical containing 2 carbon atoms and $R^2$ represents a member selected from the group consisting of alkyl radicals containing from 1 to 4 carbon atoms, inclusive, hydroxyalkyl radicals containing from 2 to 4 carbon atoms, inclusive, carbalkoxy-substituted alkyl radicals containing from 2 to 6 carbon atoms, inclusive; and carboxyl-, carbamido-, and nitrilo-substituted alkyl radicals containing from 2 to 4 carbon atoms, inclusive. The amount of sulfide necessary is determined by the number of chloromethyl groups present in the polymer starting material with about 1 to 50 percent in excess of an equivalent amount of sulfide being employed.

In an alternative method where the chloromethylated polymer starting material is employed in the form of a solution which utilizes an essentially water-insoluble solvent in which the organic sulfide is also soluble, the sulfide may be added prior to the addition of the organic transfer-solvent. The organic transfer-solvent, however, must be employed prior to the addition of water.

Following completion of the sulfide addition and a post-sulfide addition period of between 0 to about 300 minutes, water is added in an amount sufficient to provide a final solution containing from about 5 to 40 weight percent solids. As previously discussed, it is necessary to add the water at a rate sufficiently slow to maintain the system in essentially a single phase. After completion of the water addition a major proportion of the chloromethyl groups which have not reacted to form sulfonium groups will continue to react with the sulfide present to form more sulfonium groups or will be hydrolyzed.

The following examples describe completely representative specific embodiments of the present invention. These examples, however, are not to be interpreted as limiting the invention other than as defined in the claims.

EXAMPLE I

A quantity of 100 pounds of polystyrene, having an approximate molecular weight of 20,000 was chloromethylated in a 100 gallon glass lined reactor to furnish approximately 7.6 chloromethyl groups per 10 aromatic nuclei following the procedure of U.S. Patent 2,694,702. The reaction mixture was then cooled to 30° C. and 340 pounds of methylene chloride was poured into the agitated reactor to dissolve the entire chloromethylation reaction product.

The reactor contents was cooled to 16° C. and 500 pounds of water at a temperature of 5° C., was slowly pumped into the agitated reaction mixture at a rate such that the temperature did not rise above 30° C. This addition required approximately two hours, during which time the water hydrolyzed residual chloromethyl methyl ether originally employed to achieve chloromethylation.

The resulting mixture was agitated for an additional 20 minutes and the methylene chloride phase allowed to settle out. The water phase was siphoned off and an additional 500 pounds of water was then added, with stirring, to the reactor. Again the reactor contents was agitated for 20 minutes, the organic and aqueous phases were allowed to separate, and the water layer was removed. A mixture of 80 pounds of concentrated hydrochloric acid, 10 pounds of methylene chloride, and 420 pounds of water was then pumped into the reactor. The acid catalyzed the hydrolysis of the methylol by-product to methanol and formaldehyde which were more easily extracted with water. The methylene chloride added replaced that lost due to solubility in the water phase. Once again, 20 minutes of agitation was followed by a pause for separation of the phases and the water phase siphoned off. The addition of acid, methylene chloride and water followed by agitation, phase separation, and removal of water phase was repeated twice more to complete the hydrolysis of essentially all of the methylol.

The reaction mixture was finally washed with three 500 pound portions of water to remove residual acid. After this final phase separation, the methylene chloride solution was centrifuged to remove trapped water. Methylene chloride was then removed under vacuum at 30 to 35° C. until the solution became thickened (60 to 65 percent solids).

A quantity of 120 pounds of 2-(2-ethoxyethoxy)-ethanol was pumped into the reactor. (If residual water were not removed in the previous step, two phases would now form. The water would raise the solubility parameter of the 2-(2-ethoxyethoxy)ethanol phase and make it incompatible with the methylene chloride-polymer phase.) The temperature was then raised to 55° C. and 117 pounds of thiodiglycol was pumped in at a rate such that the overall solution just remained clear. Pumping too fast produces a cloudy two-phase mixture. Upon completion of the sulfide addition, 650 pounds of water at 55° C. was then pumped into the reactor, with stirring, at a rate such that the overall solution remained clear. During this water addition the methylene chloride vaporized from the solution. Upon completion of the water addition the product was packaged.

In place of thiodiglycol, 2-(methylthio)-ethyl propionate was employed in the above procedure to yield the corresponding sulfonium polymer.

Other sulfides, as characterized above, are substituted in place of thiodiglycol with advantageous results. The sulfonium polymers thereby resulting are also useful although many possess an undesirable odor not associated with the thiodiglycol product.

The following procedure describes the results of an analysis of the product prepared in accordance with Example 1.

*Procedure A*

Part of the sulfonium polymer prepared in Example 1 was precipitated from solution by the addition of a large excess of acetone and the precipitate filtered off. A portion of the filtered material was air dried and then placed in a desiccator for further drying. Microanalytic results are tabulated in Table I, below.

| Percent C | Percent H | Percent S | Percent Cl | Percent Sulfonium based on S analysis | Percent Maximum Sulfonium based on percent chloromethylation |
|---|---|---|---|---|---|
| 60.38 | 6.67 | 9.40 | 10.90 | 80.5 | 88.5 |

We claim:
1. A process for the preparation of water-soluble and uniformly water-dispersible arylmethylene sulfonium polymers which comprises the steps of:
   (A) preparing a first solution containing from about 5 to 60 weight percent of a chloromethylated arylvinyl polymer in an organic transfer-solvent, said polymer having
      (1) an average of from about 0.4 to 1.0 chloromethyl groups per aryl nucleus, and
      (2) an average molecular weight of from about 5,000 to 200,000
      said organic transfer-solvent being soluble to at least 15 weight percent in water, and capable of dissolving at least 5 weight percent water;
   (B) maintaining said solution at a temperature of between about 30° to 70° C. while adding from about 1 to 50 weight percent in excess of the amount of an organic sulfide theoretically necessary to react with the chloromethyl groups of said polymer, said sulfide addition being at a rate to maintain a visually clear solution; and
   (C) adding an amount of water sufficient to yield a final solution containing from about 5 to 40 weight percent solids, said water being added within about 6 hours after said sulfide addition at a rate to maintain an essentially one phase reaction solution which is maintained at a temperature of between about 30° to 70°C.
whereby a water-soluble to uniformly water-dispersible arylmethylene sulfonium polymer is produced.

2. The method of claim 1 wherein said organic sulfide is thiodiglycol.

3. The method of claim 1 wherein said organic transfer-solvent is selected from the group consisting of 2-

(2-ethoxyethoxy)-ethanol, 2-(2-methoxyethoxy)-ethanol, dioxane, acetone and isopropyl alcohol.

4. The method of claim 1 wherein an initial solution of said chloromethylated arylvinyl polymer dissolved in an essentially water-insoluble halogenated hydrocarbon solvent is purified by aqueous extraction of excess chloromethylation reactants and by-products and said purified initial solution is employed to prepare said first solution.

5. The method of claim 4 wherein said halogenated hydrocarbon solvent is selected from the group consisting of methylene chloride, ethylene dichloride and ethylidene dichloride.

References Cited by the Examiner
UNITED STATES PATENTS 3,216,979   11/1965   Sexsmith et al. _____ 260–29.6

MURRAY TILLMAN, *Primary Examiner.*

W. J. BRIGGS, SR., *Assistant Examiner.*